Feb. 21, 1928.

M. B. LLOYD 1,659,574

MACHINE FOR PRODUCING WOODEN ARTICLES

Filed Feb. 1, 1923    10 Sheets-Sheet 1

WITNESS:
Mary Brennan

INVENTOR.
Marshall B. Lloyd
BY
Arthur M. Nelson
ATTORNEY.

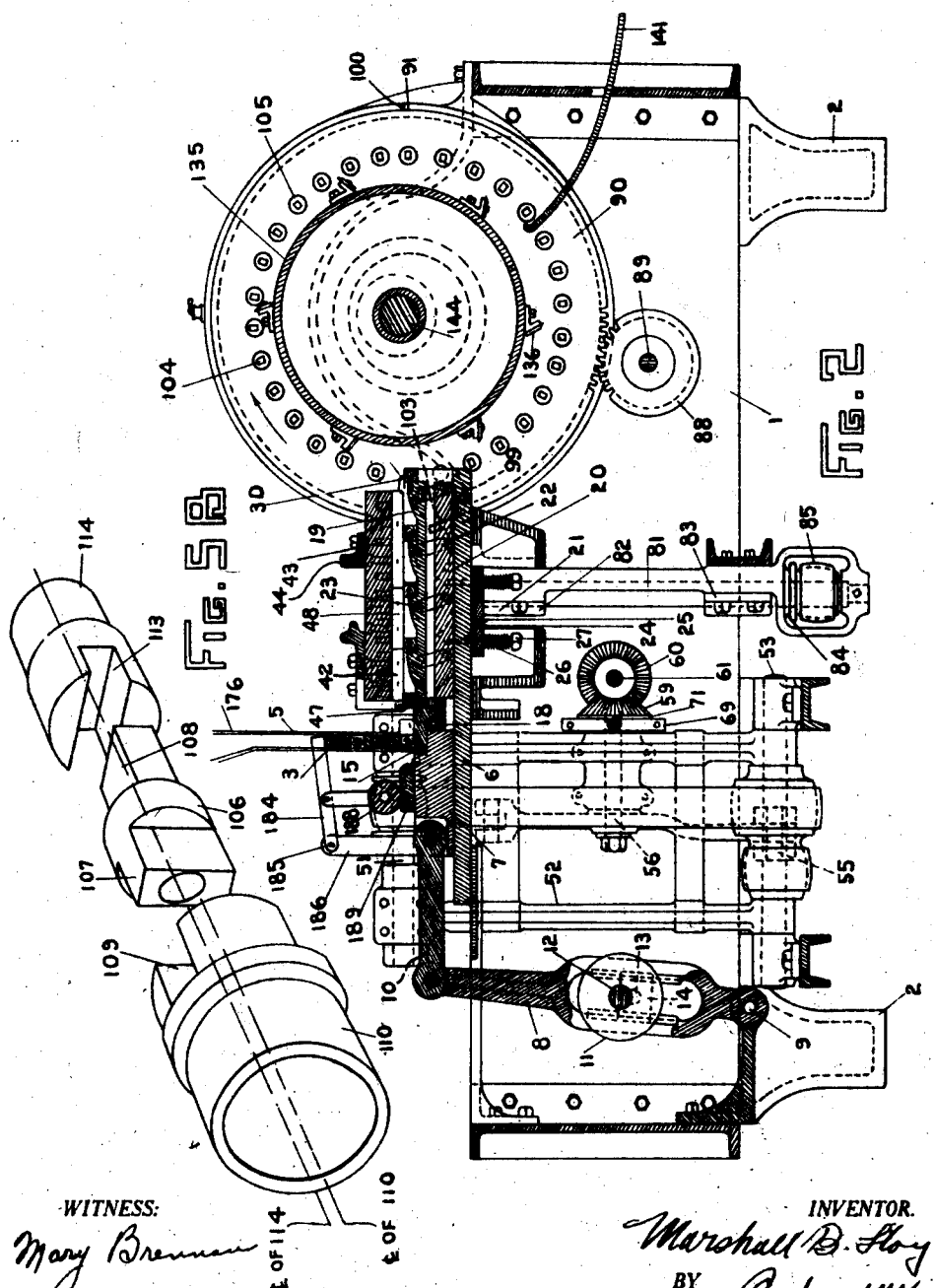

Feb. 21, 1928.
M. B. LLOYD
1,659,574
MACHINE FOR PRODUCING WOODEN ARTICLES
Filed Feb. 1, 1923 10 Sheets-Sheet 3
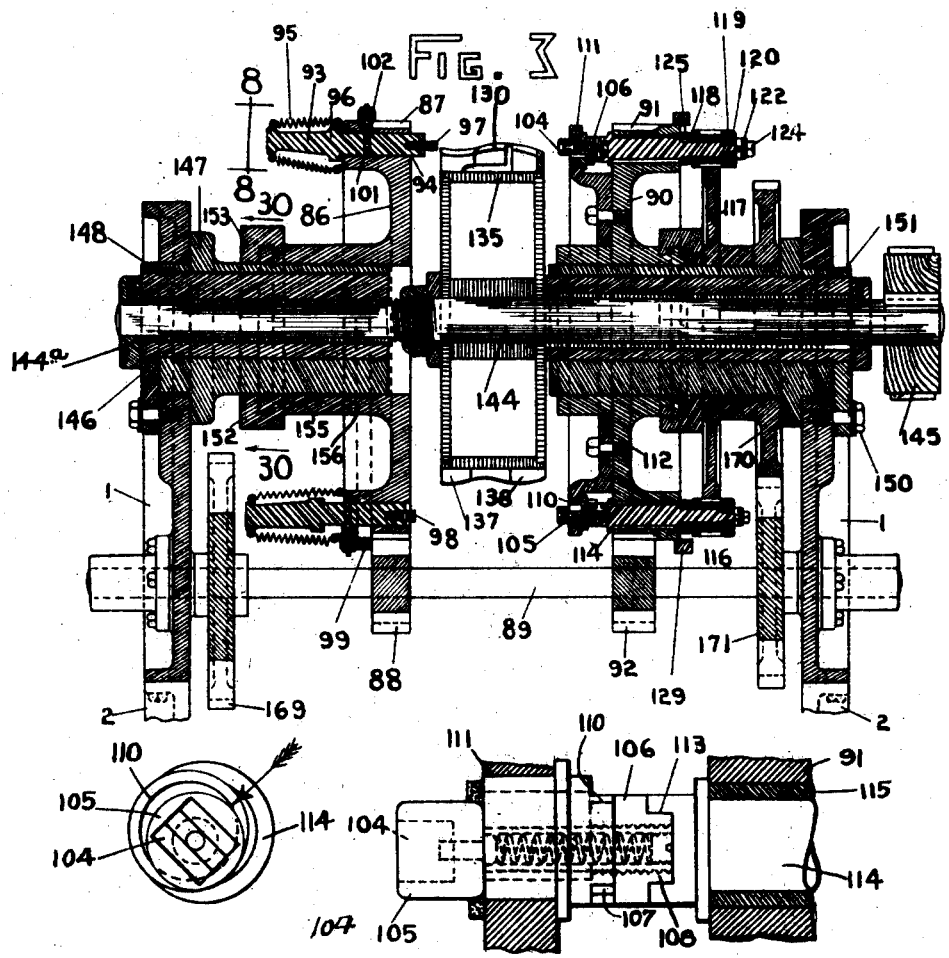
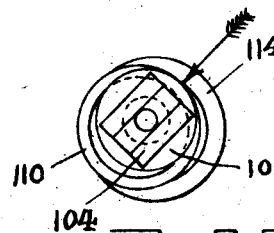
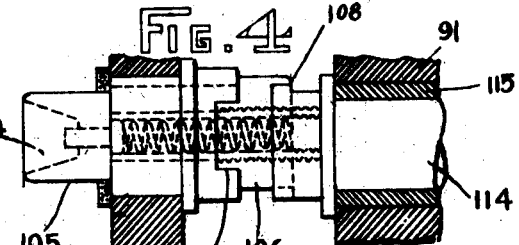
INVENTOR.
Marshall B. Lloyd
BY
ATTORNEY.

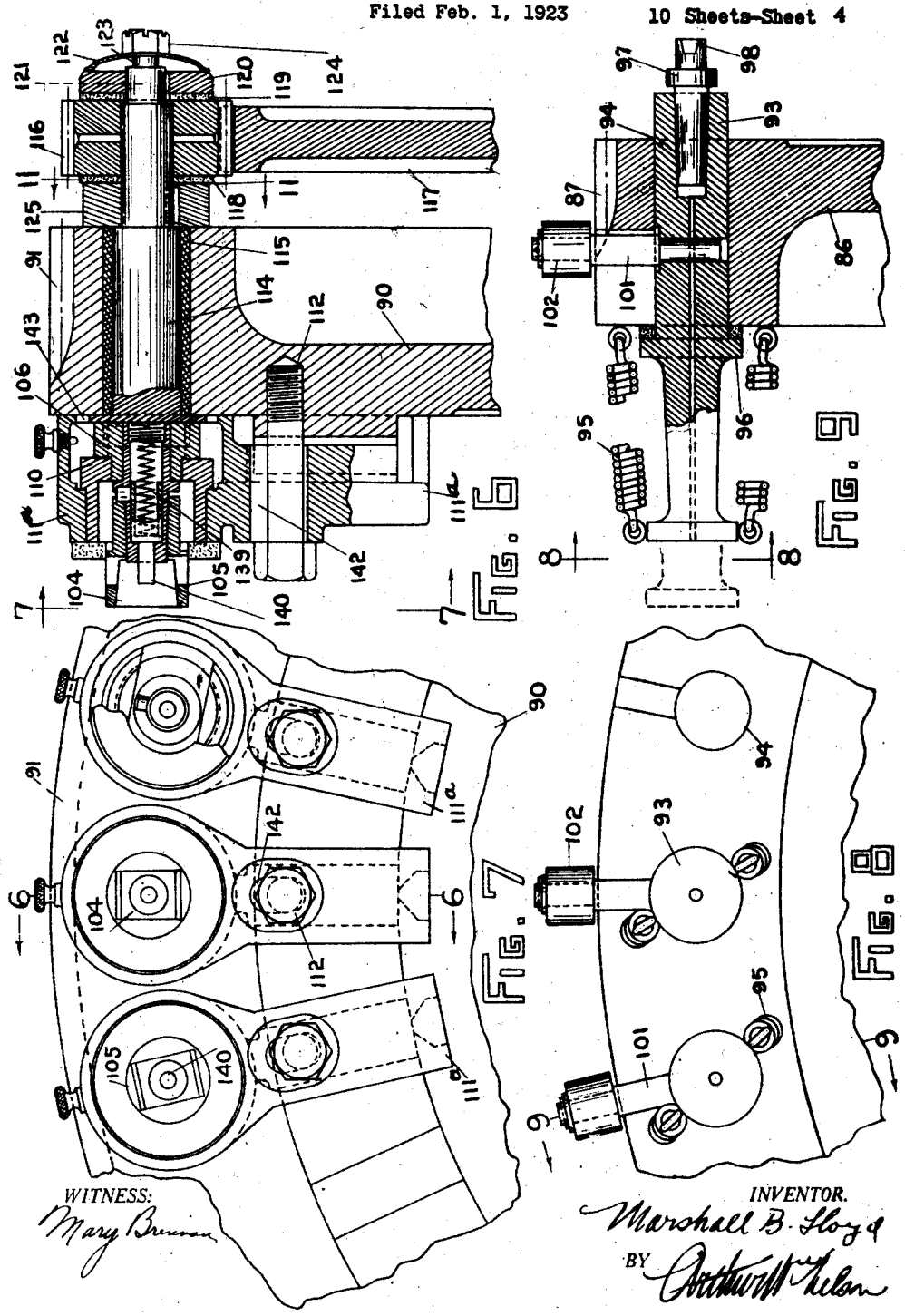

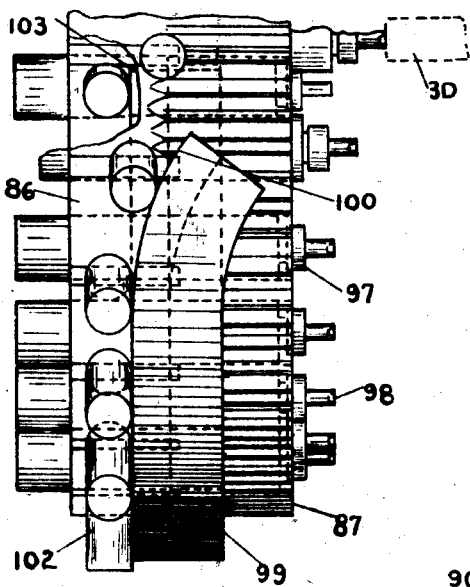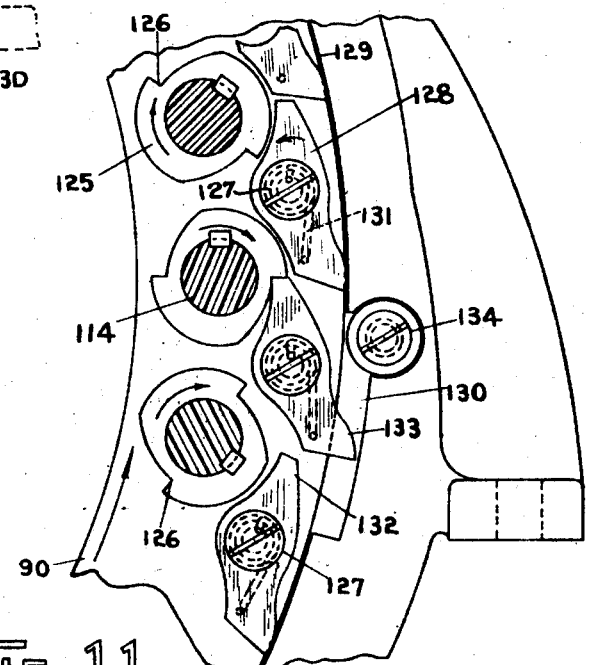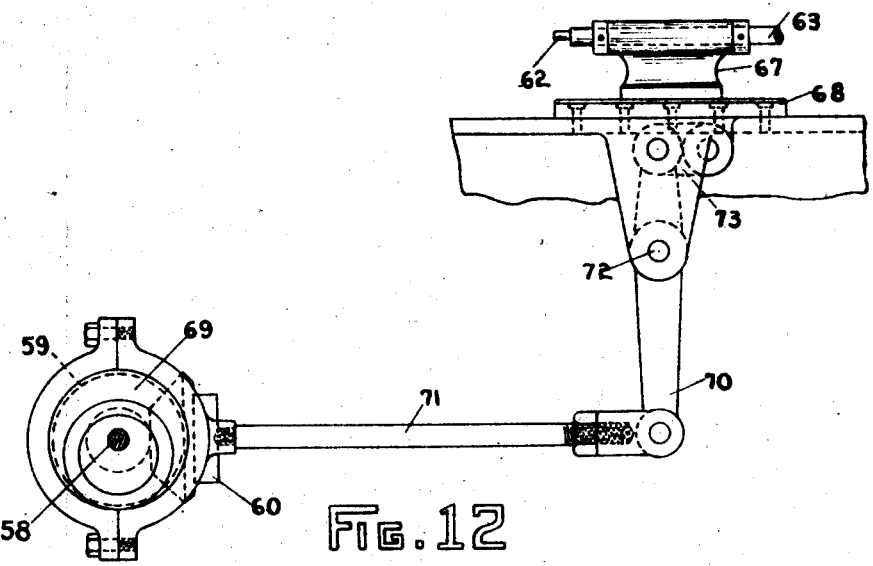

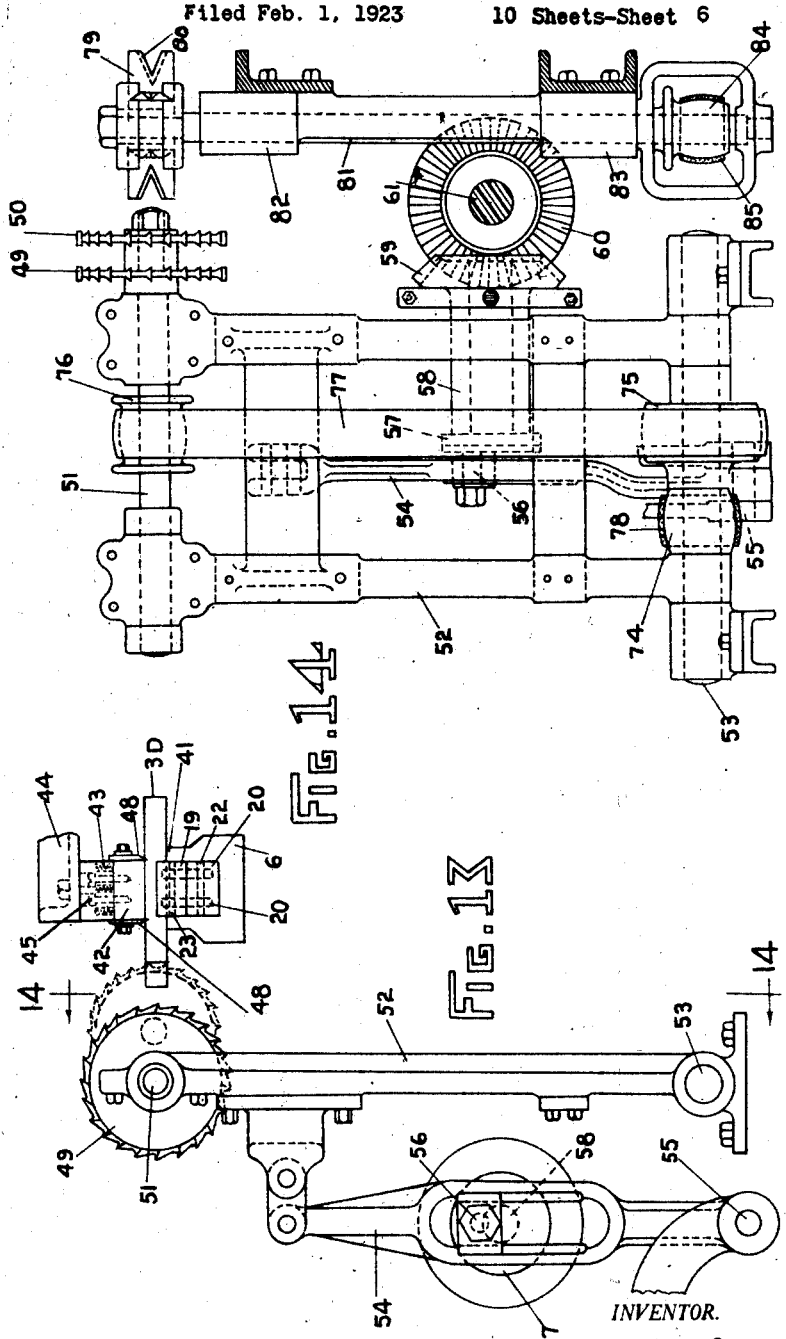

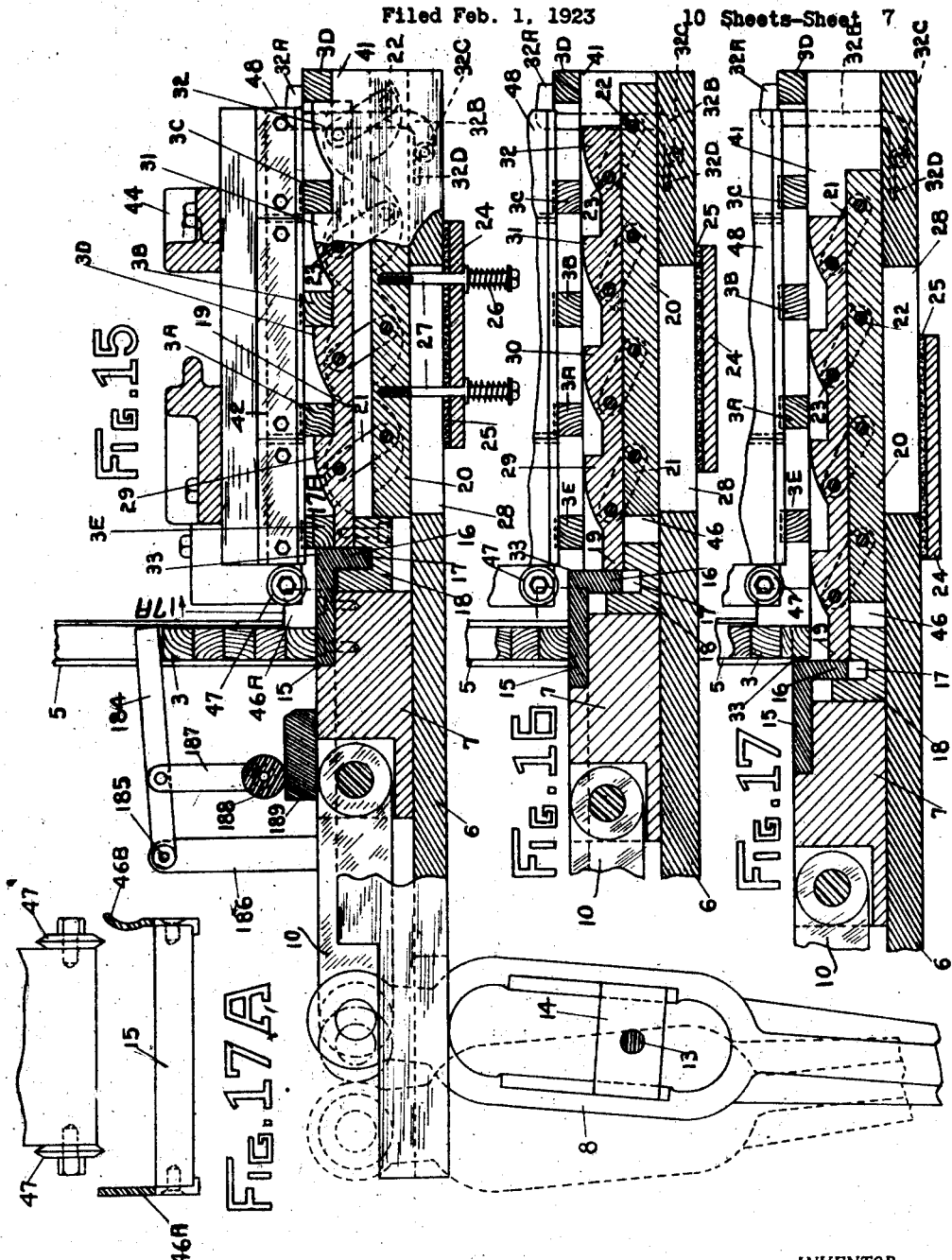

Feb. 21, 1928.
M. B. LLOYD
1,659,574
MACHINE FOR PRODUCING WOODEN ARTICLES
Filed Feb. 1, 1923     10 Sheets-Sheet 8
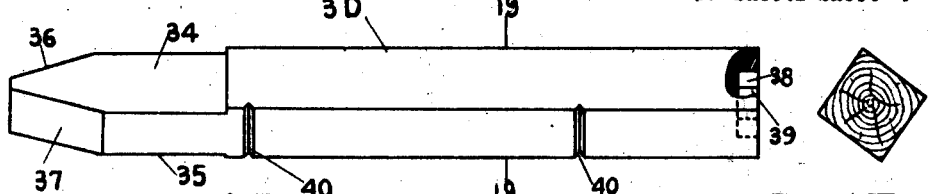
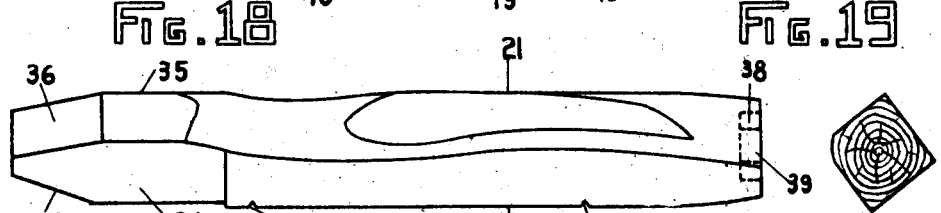
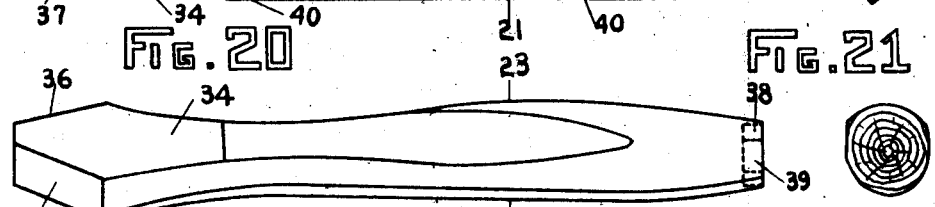
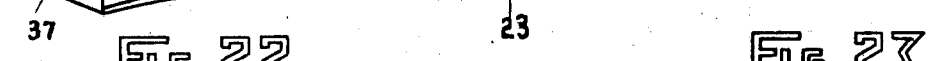
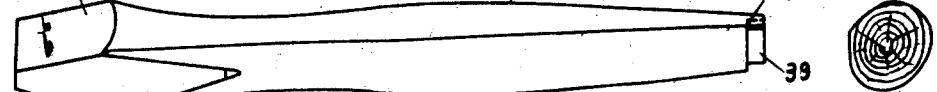
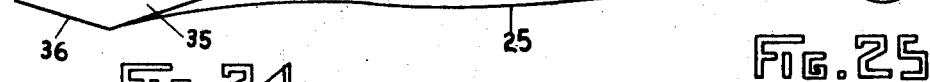
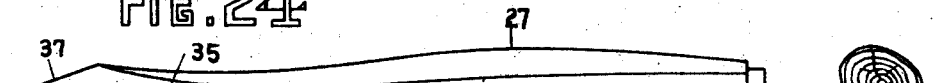
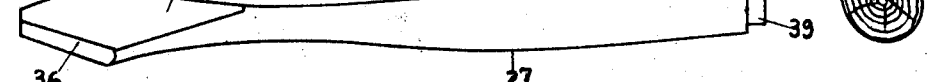
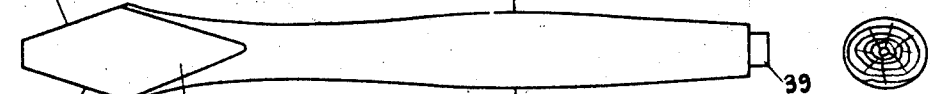
WITNESS:
Mary Brennan
INVENTOR.
Marshall B. Lloyd
BY
ATTORNEY.

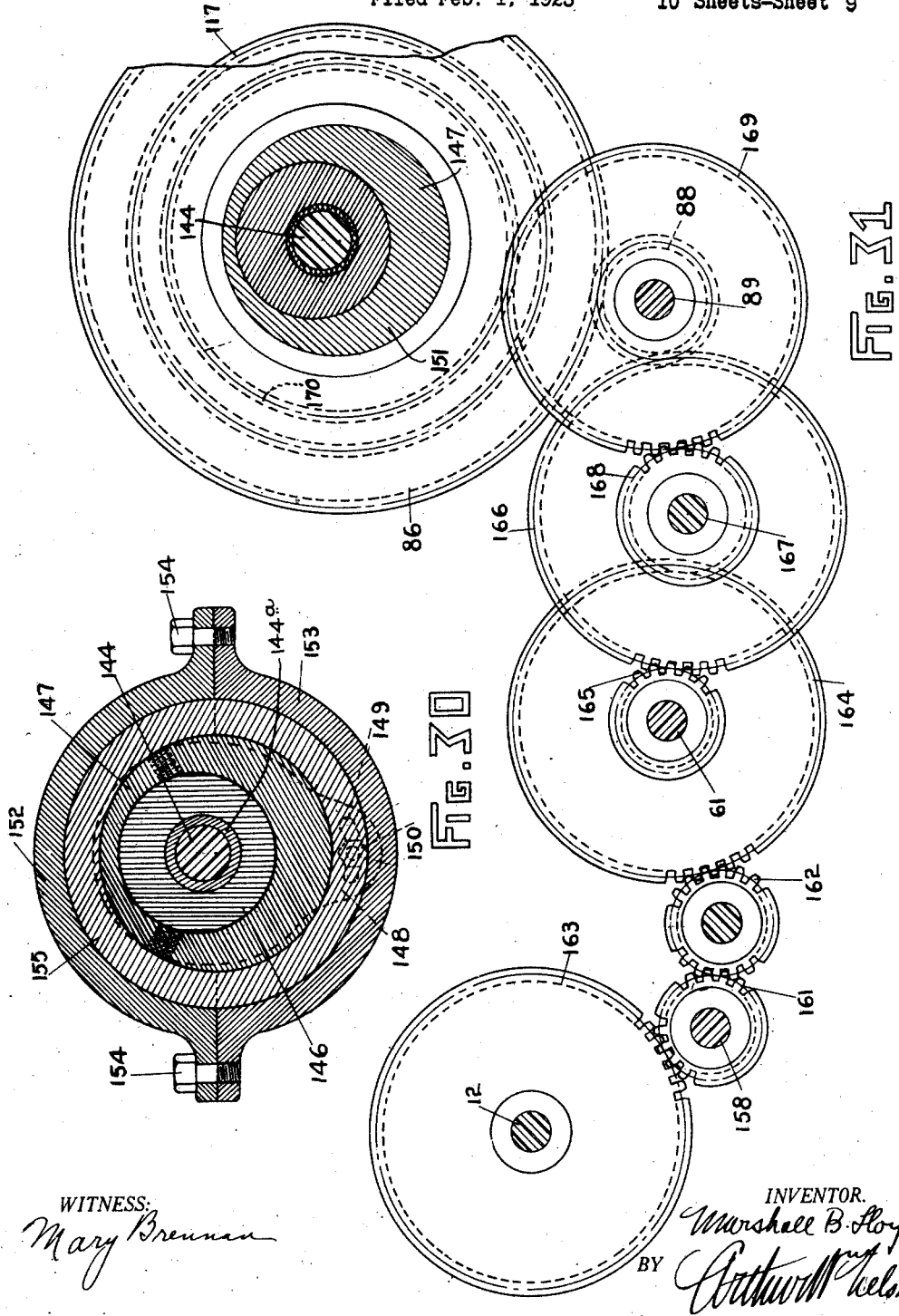

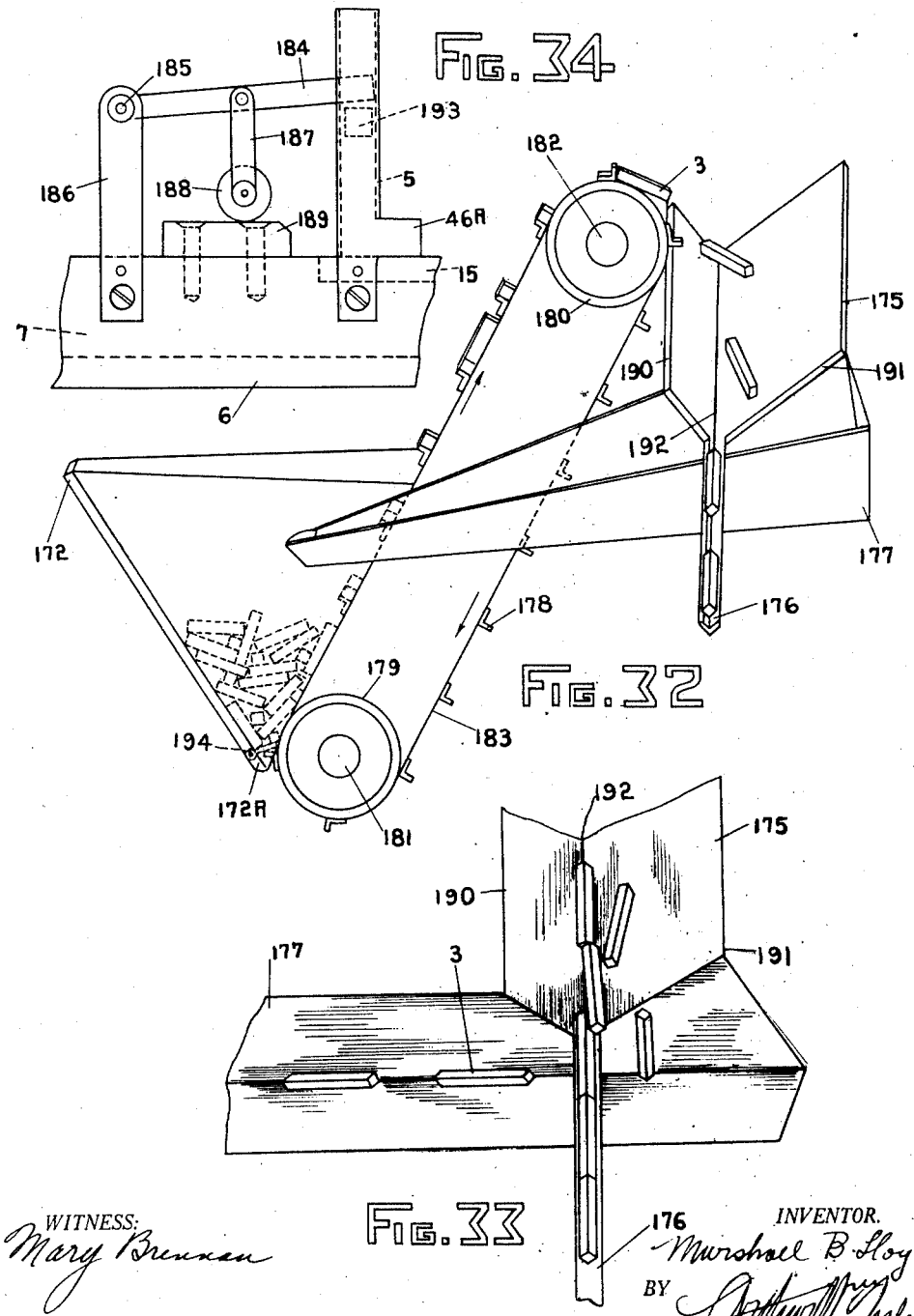

Patented Feb. 21, 1928.

1,659,574

UNITED STATES PATENT OFFICE.

MARSHALL B. LLOYD, OF MENOMINEE, MICHIGAN.

MACHINE FOR PRODUCING WOODEN ARTICLES.

Application filed February 1, 1923. Serial No. 616,329.

My invention relates generally to machines for producing wooden articles but relates more particularly to machines for producing shaped wooden articles.

The general object of my invention is to provide mechanism which shall be adapted to produce wooden articles, and particularly shaped wooden articles, more rapidly, more perfectly, more economically, and with less manual labor than has been possible hitherto.

Another object of my invention is to provide mechanism whereby irregularly shaped articles can be produced without the use of a templet.

I aim also to provide mechanism whereby different acts can be simultaneously performed upon a plurality of pieces, the pieces automatically forwarded from step to step and automatically discharged as a finished article all within a minimum of time and space.

A further object of my invention is to provide automatic mechanism for carrying out certain of the steps in the methods of producing wooden articles which are described and claimed in my co-pending applications filed January 11, 1923, Serial Number 612,089, and filed January 11, 1923, Serial Number 612,090.

My invention consists generally in mechanism of the form, arrangement, construction and coaction of the various parts, whereby the above named objects, together with others that will appear hereinafter, are obtainable; and my invention will be more readily understood by reference to the accompanying drawings which illustrate what I consider, at the present time, to be the preferred embodiment thereof.

In said drawings:

Fig. 2 is a vertical longitudinal section along the line 2—2 of Fig. 1 viewed in the direction of the arrows.

Fig. 3 is a transverse vertical section along the line 3—3 of Fig. 1.

Fig. 4 is a side view of certain of the parts for causing a to and fro movement of the wooden piece as viewed in the direction of the arrow in Fig. 4$^A$.

Figure 1:
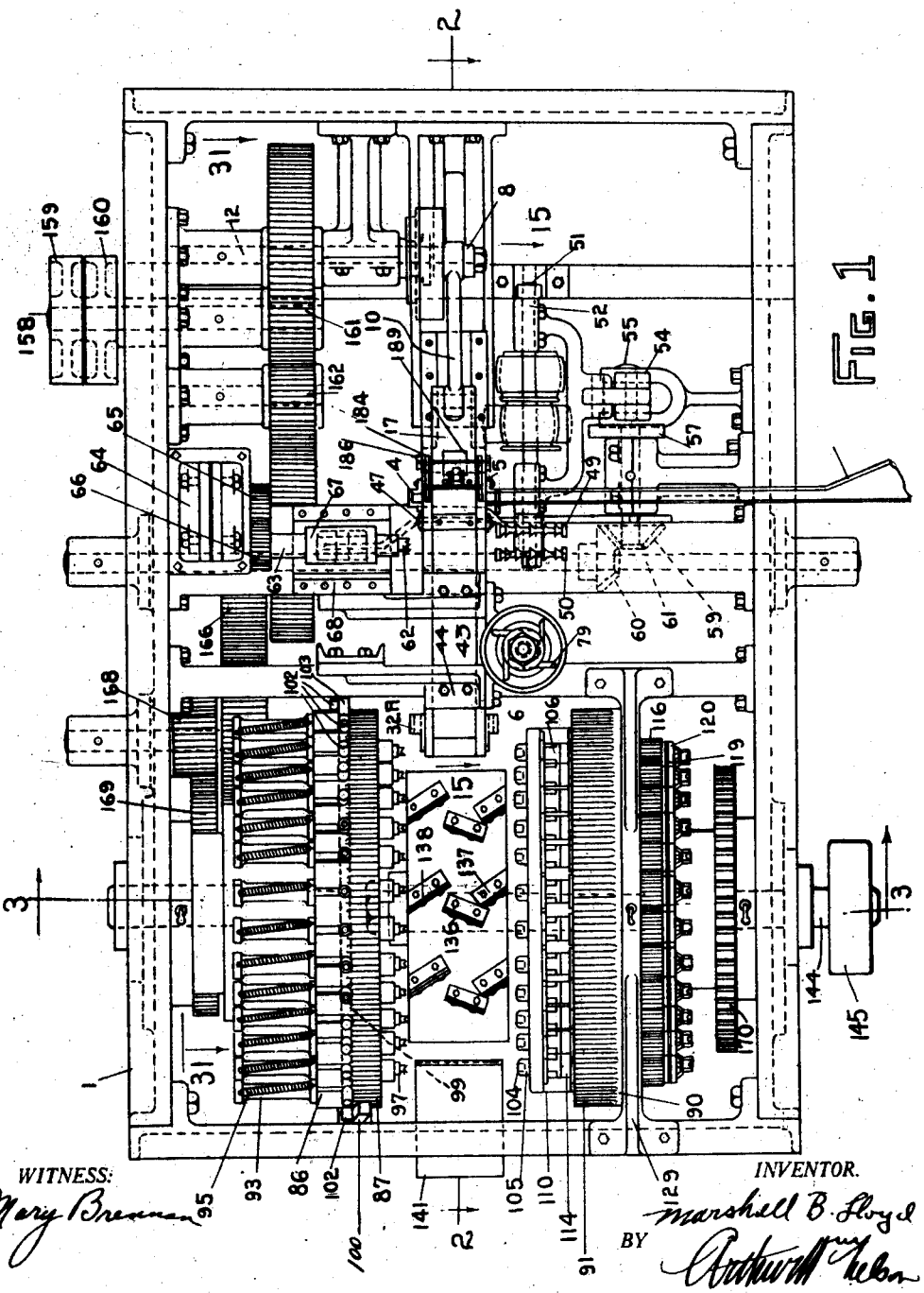
Fig. 1 is a plan view of the machine embodied in my invention.

Fig. 4$^A$ is an end view of the parts shown in Fig. 4.

Fig. 5 is a view similar to Fig. 4 but illustrating the parts in a different position, said view being as looked at in the direction of the arrow in Fig. 5$^A$.

Fig. 5$^A$ is an end view of Fig. 5.

Fig. 5$^B$ is a descriptive view illustrating the parts shown in Figs. 4 and 5 disconnected but aligned in assembly relation, better to disclose the construction and operation thereof.

Fig. 6 is a transverse sectional detail assembly view of the complete mechanism for causing to and fro movement of the wooden piece being a slight modification of the similar parts shown in Fig. 3 to enable adjustment.

Fig. 7 is a view along the line 7—7 of Fig. 6 showing a number of the piece holding and moving devices, certain of the parts being broken away better to disclose the interior construction.

Fig. 8 is a fragmentary or detailed view showing a number of the parts and viewed substantially along the lines 8—8 of Fig. 3 but upon an enlarged scale.

Fig. 9 is a detailed view partly in section and partly in elevation substantially along the lines 9—9 of Fig. 8.

Fig. 10 is a fragmentary top plan view of a portion of the machine illustrating the mechanism for automatically releasing the wooden pieces, a part thereof being broken away to disclose the means whereby the pieces are automatically gripped for presentation to the body shaping cutters.

Fig. 11 is a detail face view of the mechanism for stopping the rotation of the piece holding means, being viewed substantially along the line 11—11 of Fig. 6.

Fig. 12 is a detail view, transversely of the machine, illustrating the mechanism for moving the spoke tenoning cutter to and from the piece.

Fig. 13 is a detail vertical view of mechanism for shaping one end of the piece.

Fig. 14 is a view substantially along the line 14—14 of Fig. 13.

Fig. 15 is an enlarged detail view partly in section and partly in elevation, substantially along the line 15—15 of Fig. 1.

Fig. 16 is a detail sectional view of certain parts shown in Fig. 15 but showing them in a different position.

Fig. 17 is another fragmentary view similar to Fig. 16 but illustrating the parts in still another position.

Fig. 17^A is a detail view substantially along the line 17^A—17^A of Fig. 15.

Fig. 18 is a perspective view of the piece after certain of the shaping operations have been performed thereon.

Fig. 19 is a sectional view along the line 19—19 of Fig. 18.

Figs. 20, 22, 24, and 26 are perspective views of the piece illustrating different stages during the shaping of the body portion thereof.

Figs. 21, 23, 25, and 27 are respectively sectional views along the lines 21—21, 23—23, 25—25, and 27—27 of Figs. 20, 22, 24, and 26.

Fig. 28 is a view of the finished article and Fig. 29 is a sectional view along the line 29—29 of Fig. 28.

Fig. 30 is an enlarged detail sectional view substantially along the line 30—30 of Fig. 3; and Fig. 31 is a view illustrating the train of gears taken substantially along the line 31—31 of Fig. 1.

Fig. 32 is a side elevation of mechanism for automatically delivering wooden pieces to the magazine of the machine.

Fig. 33 is a fragmentary top view of that part of the mechanism of Fig. 32 that acts to position the pieces properly for delivery to the magazine; and Fig. 34 is a fragmentary side elevation of the mechanism that regulates the feeding of the pieces to the magazine.

My mechanism may be used for the manufacture of a variety of different articles but I have chosen to illustrate a specific design thereof which is adapted particularly to the production of wooden vehicle wheel spokes. This is done in order that a concrete illustration of a well known article may be had and should therefore be considered as by way of illustration and not by way of limitation. Wooden vehicle wheel spokes are also typical of a class of irregularly shaped wooden articles in which it has been customary to employ a templet for guiding the cutting devices, particularly those operating upon the body portion of the spoke. Such articles as heretofore produced have required a number of different machines, each independent of the other and also a considerable amount of manual manipulation. As a result the production of such articles have been relatively slow, laborious and expensive. As heretofore produced such articles have also generally required a sanding or other operation for smoothing purposes. The machine operations, as heretofore conducted, have been such as to require the shaping of the body portion of the spoke, first, and the subsequent shaping of the butt portion and the tenon at the opposite end. The spoke under such treatment cannot well be handled with the result that many irregularly or improperly shaped, and hence defective, spokes result. I have produced mechanism wherewith a piece of the proper length can be automatically delivered, automatically fed forward; the butt portion shaped at one end thereof and the reduced tenon portion at the opposite end; the pieces automatically and successively gripped and thence advanced along a path approaching the body shaping knives or cutters whereby the body of the spoke is shaped during such advancing movement, and finally means whereby the complete finished and shaped spokes are successively and automatically discharged from the machine.

Referring now to the drawings for the detail of construction, 1 represents the frame of the machine which as here shown is substantially rectangular in plan view. It is supported at a convenient height by means of suitable legs 2. Considering the machine as in the plan view, Fig. 1, the mechanism for shaping the end portions of the spoke is arranged substantially at the right hand end of the machine, and the mechanism for shaping the body portion substantially at the left hand half of the machine.

The wooden pieces 3 of substantially the proper length but of somewhat oversize cross sectional size are stacked, one upon the other, in the magazine that is formed by the upstanding spaced channel members 4 and 5, which channel members are secured to an immovable part of the machine. The mechanism for automatically supplying the magazine with pieces can be more conveniently described later and it will be found hereinafter under the heading Mechanism for delivering pieces to the intermittent feeding mechanism. Assuming, therefore, for the present that the necessary pieces are supplied to the magazine, the operations to be performed and the design of the machine is such that the pieces 3 are fed intermittently forward from the magazine in a predetermined spaced relation, and after the machine has assumed regular operation a plurality of pieces 3 will always be intermittently and simultaneously advanced, as well shown in Figs. 2, 15, 16 and 17.

*The intermittent feeding mechanism.*

The intermittent feeding mechanism is mounted upon a stationary base plate 6 and comprises a slidable block member 7 which is moved back and forth by means of a lever 8 which is pivoted to the frame of the machine at 9 and which is connected to the block 7 by the link 10. The lever 8 is actuated by the crank 11 that is mounted upon shaft 12. The rotation of the shaft 12 is effected by means hereinafter described. Crank pin 13 enters a box 14 that is slidable in lever 8 to permit the necessary relative movements of the parts. To the block 7 is affixed the plate 15 having a downwardly extending tongue-like forward portion 16 which enters slidably into a groove 17 that is formed in a portion 18 that is mounted on the underside of one end of the piece guiding and lifting element 19. The element 19 is attached to a plate-like element 20 that is arranged for sliding movement on the base plate 6, by means of a plurality of links 21 pivotally joined to the respective parts by means of pivot pins 22 and 23 respectively. While the plate-like element 20 is adapted to slide on plate 6, its sliding movement is restrained by means of a friction device which as here shown comprises a plate 24 having a friction surface 25 that is yieldingly pressed against bottom face of the base plate 6 by means of springs 26 that are positioned on bolts 27 that depend from the member 20. The base plate 6 is provided with an elongated slot 28 to permit the bolts 27 to move back and forth with the member 20.

The operation of the intermittent feeding mechanism will probably be best understood by first considering the parts as being in the position shown in Fig. 15 at which time the member 19 is spaced upwardly from the member 20 so that the various lug-like portions 29, 30, 31 and 32 of the member 19 and the shoulder 33 of the member 15 abut adjacent wooden pieces 3$^A$, 3$^B$, 3$^C$, 3$^D$, and 3$^E$ respectively. When the wooden pieces are in this position they are at rest, the piece 3$^D$ being in position to be gripped by the mechanism later to be described, whereby the piece will be carried into contact with the cutters that shape the body portion. The piece 3$^D$ is at this time in the condition shown in Figs. 18 and 19, that is to say the butt portion of the spoke has been shaped to provide the opposite parallel faces 34 and 35 and the bevel or tapering faces 36 and 37. The opposite end has been provided with an annular groove 38 which forms the reduced tenon portion 39. In the upper face of the piece there has also been formed V shaped grooves 40 which serve as a means of guiding the spoke member in its advancement through the intermittent feeding mechanism. The grooves 40 are always formed at a predetermined distance from the bottom face of the piece, and at a predetermined distance from one end, so that slight irregularities in the dimension of the piece are unimportant. This means that the piece need not be accurately sized before it is presented to my machine and therefore results in reducing the cost of preparing the pieces. These various portions are shaped by mechanism about to be described as the pieces are intermittently fed forward. In feeding the pieces forward, considering the parts as being positioned as shown in Fig. 15 the lever 8 swings to the left and when it reaches the dot and dash position shown in Fig. 15, the parts will be positioned as shown in Fig. 16. That is to say, as the member 7 moves to the left, the first action is to swing the member 19 downwardly since the member 20 is restrained by the friction plate and surface 24 and 25. So soon, however, as the member 19 engages the member 20, and no further swinging movement is possible, the links 21 act to drag the plate 20 to the left so that when the lever 8 reaches the dotted position shown in Fig. 15, the various parts will be positioned as shown in Fig. 17. During this movement of the parts to the left, as described, the various pieces rest on the upstanding side portions 41 of the base plate 6, against which they are pressed by means of a vertically yieldable block 42. The block 42 is pressed downwardly by means of the compression springs 45, the upper ends of which enter a block 43 which is secured to the frame portion 44 of the machine. As the parts have thus moved from the position shown in Fig. 15 to the position shown in Fig. 17, it will be observed that the shoulder portion 33 of the member 15 and the lug portions 29, 30, 31, and 32, have moved to the left a distance slightly greater than the spaced relation of the various pieces 3$^A$, 3$^B$, etc. This permits the lowermost piece 3 in the magazine to drop downwardly in front of the shoulder 33. As the lever 8 now swings to the right from the dotted line position, the first action is to push the block 7 to the right thus moving with it the member 15 which of course soon engages the lowermost piece 3 in the magazine and moves it or feeds it forward. But the instant the member 15 commences to move, it causes movement of the member 19 forward and upward or rather primarily upward under the influence of the links 21. This is so, because the member 20 is restrained from moving to the right by virtue of the friction surface 25. This upward movement of the member 19 again places the lug portions 29, 30, 31 and 32 behind the various pieces so that later advancing movement of the parts causes corresponding advancing movement of the pieces. When the space 46 (see Figs. 16 and 17) between the left hand end of the member 20 and the member 18 is taken up, further movement of the member 7 to the right causes movement of both the parts 19 and 20 since the positive push overcomes the restraining friction action of the plate 25. The piece in the magazine is thereby advanced from a position corresponding to the position in Fig. 17 to the position of the piece 3$^B$ in Fig. 15, and the other pieces are advanced a like distance. As the piece moves from the magazine position to the position of the piece 3^E in Fig. 15, it is pushed against the stop 46^A by spring 46^B both of which are secured to the magazine. Thereafter, it passes under spaced rollers 47, the edges of which are V shaped. It is these rollers 47 that form the V grooves 40 in the piece. Aligned with the rollers 47 and to the right thereof, considering the parts as positioned in Figs. 15, 16, 17 and 2 will be found guide rails 48 secured to the yieldable member 42, which rails are V shaped at their lower edges. They are positioned, therefore, so that as the piece leaves the rollers 47 that form the grooves 40, the pieces are caused to engage the V shaped rails. These V shaped rails prevent any tendency of the pieces to cant or twist and hence maintain them in proper position for the various cutting operations. The piece 3^E is positioned so that the tenon forming mechanism and the mechanism for forming the faces 34 and 35 may act properly thereon.

The faces 34 and 35 are formed or cut by two high speed rotary cutters 49 and 50 which are spaced apart the desired distance. They are mounted for rotation upon a shaft 51 that is carried in a swingable bracket-like frame 52 which bracket frame is mounted at its lower end upon a shaft 53 which shaft is mounted in suitable bearings carried by the frame of the machine. The cutters 49 and 50 are adapted by the swinging movement of the frame 52 to move inwardly to the dotted line position shown in Fig. 13 in the course of which movement they obviously remove the surplus stock. For swinging the frame 52 there is provided a lever 54 which is pivoted to the frame of the machine at 55 which lever 54 is actuated by the crank pin 56. The crank pin 56 is mounted on the crank 57 that is secured to the shaft 58. Also secured to the shaft 58 is a bevel gear 59 that meshes with a bevel gear 60 that is secured to rotate with the transversely positioned shaft 61. The gearing for operating the shaft 61 will be later described, but it will be understood that it is timed to operate in proper sequence with the other operating parts of the machine. As the cutters 49 and 50 swing toward the piece to cut the faces 34 and 35 a rotary cutter moves towards the opposite end of the piece to form the annular groove 38 and reduced portion or tenon 39. This mechanism is probably best shown in Figs. 1 and 12. The rotary cutter 62 which is hollow is mounted for rotation with the shaft 63 which shaft is adapted to move to and from the piece while it is being rotated at high speed through the medium of the motor 64 and the meshing gears 65 and 66 secured respectively to the armature shaft of the motor and the drive shaft 63 of the rotary cutter. For causing to and fro movement of the cutter 62 there is provided a slidable member 67 suitably guided in a way 68. Reciprocating movement is derived from the shaft 58 on which there is mounted an eccentric motion device 69 which serves to oscillate the lever 70 by means of connection link or rod 71. The lever 70 is pivoted at 72 in the stationary part of the machine and at its upper end it is connected to the link 73 that connects with the slidable member 67. It should be obvious, therefore, that this mechanism causes the to and fro movement of the cutter 62 and since it is actuated by the same shaft 58 that operates the mechanism that swings the cutters 49 and 50 that both cutters operate in proper timed relation. After the cutters 49 and 50 and 62 have moved inwardly to shape the ends as stated they again move outwardly free from the ends of the piece, at which time the feeding mechanism again comes into action feeding the various pieces forward a predetermined distance at which time the next following piece is positioned properly to receive the cutters just described. Before leaving the description of the cutters 49 and 50, it should be stated that they are rotated at high speed by means of the pulley 74, pulleys 75 and 76 and a connecting belt 77. The pulley 74 is driven from any suitable source of power by means of a belt 78.

As the pieces feed forward from the position just described one end portion thereof passes into engagement with and passes a rotary cutter 79 having V shaped cutting faces 80. The V shaped cutting faces 80 are so spaced as to cut away the end of the material and thereby provide the bevel faces 36 and 37 of the butt portion of the spoke. It should be understood that the piece is at rest when the cutters 49 and 50 and 62 respectively, operate upon the piece but that the piece is feeding forward when the cutter 79 operates thereon. The cutter 79 is mounted upon the vertical shaft 81 that operates in suitable bearings 82 and 83 and which, at its lower end, carries the pulley 84 so that it may be driven at high speed from any suitable source of power as by means of the belt 85.

There has now been performed on the piece all of the operations necessary to transform it from the condition in which it was placed in the magazine to the condition in which it appears in Figs. 18 and 19 so that the only remaining operations are those of automatically gripping the piece from the most advanced position to which the intermittent feeding mechanism moves and causing the movements necessary to shape the body portion of the spoke and finally discharge it in finished form from the machine. Before describing the final shaping operations the delivery of the pieces to the magazine will be described because parts of the intermittent feeding mechanism co-operate therewith.

Mechanism for delivering pieces to the intermittent feeding mechanism.

The pieces 3, cut to proper length, are dumped promiscuously into a hopper 172 which is preferably of a size sufficient to contain a large number thereof. One side of the hopper is formed by the endless conveyor 183 that operates over pulleys 179 and 180 that are mounted upon the shafts 181 and 182, one of which is driven by any suitable means, not shown. Thus the conveyor 183 is caused to move in the direction of the arrows. It will be observed that the conveyor has a plurality of flights 178 thereon which move through an opening or space 172$^A$ at the bottom of the hopper and thus engage and carry the pieces 3 upwardly. The pieces are prevented from falling through the opening 172$^A$ by a flap 194 which is adapted to be swung open by the engagement of the flights of the conveyor therewith. As the conveyor passes over the top pulley 180 the pieces fall by gravity upon a device 175 that positions and aligns them for proper delivery to the magazine, before described. The pieces 3 being promiscuously dumped into the hopper 172, will be carried upwardly in different positions by the conveyor and promiscuously dumped upon the device 175. This simple device, however, unerringly positions them in end to end alignment and they are in such condition when they pass on to the V-shaped guide 176. I might add here that if a greater number of pieces 3 are delivered to the device 175 than can be accommodated in end to end relation in the guide 176 the excess fall into the trough 177 and slide by gravity back into the hopper 172.

The device 175 is composed of two plates 190 and 191 which are angularly disposed to form a V-shaped trough. That is to say, the plates 190 and 191 extend upwardly from their meeting line 192. The device 175 is furthermore, as a whole, pitched downwardly. The plate 191 is wider than the plate 190 and the pieces are dropped upon the plate 191. The end of the piece 3 that is pointed downwardly on the plate 191 is the end that will first reach the guide 176. Thus, the pieces are positioned and aligned in end to end relation in the guide 176 down which they slide, by gravity, until they reach the magazine. The member 5 of the magazine is provided with an opening 193 (see Fig. 34) through which the pieces enter the magazine. Their entrance, however, is controlled by means of one of a pair of arms 184 that are pivoted at 185 on standards 186 carried by the base plate 6 of the machine. Depending from the arms 184 are members 187 carrying at their lower ends a roller 188 that engages, at times, a cam block 189 that is mounted to reciprocate with the element 7 of the intermittent feeding mechanism. Thus, it will be observed that when the parts are in the position shown in Figs. 15 and 34, the arms 184 are raised and a piece 3 is permitted to slide into the magazine through the opening 193. As the intermittent feeding mechanism moves to the left from the position shown in Figs. 15 and 34 the cam block 189 is withdrawn from under the roller 188 and the arms 184 swing downwardly. The parts are so timed that this occurs substantially at the time the corner 33 of the member 15 is in the position shown in Fig. 17, i. e. when the lowermost piece in the magazine 3 can move downwardly. The arms 184 serve to assist the gravity downward movement of the pieces in the magazine. As the arms 184 move downwardly they pass across the opening 193, thereby closing it and preventing admission of another piece 3, at that time. As the intermittent feeding mechanism moves forward, however, cam block 189 again raises the arms 184, thus uncovering the opening and permitting another piece to enter the magazine. In this manner a sufficient number of pieces are always maintained in the magazine automatically. As my machine is designed to shape pieces very rapidly this is important as I have found it difficult to keep the machine supplied by hand. The piece when it is gripped for the final body shaping operations is positioned in the position corresponding to the piece 3$^D$ in the Fig. 15 and in Fig. 2. In this position it is held by fingers 32$^A$ of the levers 32$^B$ that are pivoted to the plate 6 as at 32$^C$. The levers 32$^B$ are swung to the right (see Fig. 15) by means of torsion springs 32$^D$.

Piece gripping and holding means.

There are a plurality of sets of gripping and holding devices, one set being arranged to embrace one end of the spoke and the other set to embrace the opposite end. The devices that are to grip or hold the tenon end of the spoke are mounted in a circular member 86 which at its outward surface is provided with gear teeth 87 that mesh with the pinion 88 upon a cross shaft 89 and by which the member 86 is rotated in the direction of the arrow, see Fig. 2. The devices that grip, hold and cause certain movements of the butt end of the piece are mounted in a circular element 90 which likewise has gear teeth 91 upon its periphery which mesh with a pinion, 92 that is fixed to rotate with the shaft 89. The elements 86 and 90 are of the same diameter and so are the pinions 88 and 92 so that both the elements 86 and 90 and the various holding devices carried thereby are caused to rotate at the same speed, thus maintaining the sets of holding devices in proper operative alignment. The various holding devices carried by the element 86 are all alike so that a description of one will suffice for both. So also the various holding devices mounted in and carried by the element 90 are all alike so that a description of one of those will also suffice for all. Considering now the construction of the holding device in the element 86 which is probably best shown in Figs. 3, 8 and 9, it comprises an elongated member 93 which is arranged for sliding movement in a hole 94 formed in the element 86. A plurality of tension springs 95 tends to move the piece 93 toward the end of the wooden piece and a stop collar 96 is provided to limit this movement. At its inner end the element 93 carries a piece 97 formed with a recessed outer end 98 adapted to enter the annular groove 38 in the end of the wooden piece and to surround the tenon portion 39 thereof. Thus these holders 97, and 93 are normally positioned in full line position as shown in Figs. 3 and 9. Means are provided, however, for moving the holder to the left, i. e. to the dotted line position shown in Figs. 3 and 9, for the purpose of initially picking up the piece and finally releasing it. This mechanism comprises a cam 99 which on the far side is curved inwardly as indicated at 100. Attached to the member 93 and outstanding therefrom is a spindle 101 on which there is mounted a roller 102. As the element 86 rotates, the roller 102 finally engages the curved portion 100 of the cam 99 which causes movement of the roller and hence of the part 93 to the left of the position shown in Figs. 3 and 9, at which time the inner ends of the holders are spaced apart a greater distance than the length of the piece or spoke so that it falls from the machine. Inasmuch as the spoke is sometimes wedged rather tightly in the holder that receives the butt portion, means are provided for ejecting the spoke. The holder 93 and tip 98 ride in this outer position during the lower half of their revolution and until the roller reaches the termination 103 at which time the springs 95 cause almost instantaneous inward movement of the tip 98. The termination portion 103 of cam is so positioned that the gripping tip 98 moves inwardly just as it reaches the position occupied by the spoke 3ᴅ. The spoke 3ᴅ, at this instant, is positioned in line with the opposite holders, but not in contact with either thereof. But as the tip 98 moves inwardly it shifts the piece laterally, thus pushing the butt portion of the spoke into socket 104 of the opposite holding tip 105.

The holding tip 105 is arranged to cause the spoke to revolve and to move the butt portion inwardly toward the cutting knives and outwardly therefrom a plurality of times for each revolution of the piece. In this instance to and fro movement takes place twice for every revolution of the piece because the piece desired in this instance, is of substantially elliptical cross section along a portion thereof. If other shapes were desired, as for example, one with three face portions, the to and fro movement would be different, i. e. three times per revolution of the piece, and for other shapes a different number of times. It should be understood that the tenon end of the spoke while it may spin or rotate around the tip 98 cannot at that end move inwardly or outwardly to any considerable extent in the construction here shown. The socket tip 105 is operatively connected to rotate with a member 106 which is provided with a rectangularly shaped portion 107 projecting from one end and a similar portion 108 projecting from the opposite end but being arranged at right angles to the portion 107. The portion 107 enters a slot or guide way 109 that is formed in a rotatable bushing-like member 110. The bushing-like member 110 is arranged for rotation in a holder portion 111. The holder portion 111 is fixed to rotate with the element 90 by means of screws 112. In Fig. 3 the holder 111 is an annulus and no means are provided for radial adjustment whereas in the modification shown in Figs. 6 and 7 the holders 111ᵃ are separate devices attached to the member 90. The interior construction is otherwise substantially the same so that like reference characters will be applied to similar parts. The portion 108 in turn enters a slot or guide way 113 formed in the end of a shaft 114 which shaft is mounted for rotation in the bearing 115 carried by the member 90 upon an axis offset with respect to the axis of rotation of the member 110 in the holder 111. The end of the shaft carries a pinion 116 that meshes with a gear 117 which gear is driven by means later to be described at such speed that the shaft 114 is rotated at desired speed. Therefore when the shaft 114 is rotated the member 106, bushing 110 and the socket chuck member 105 all rotate therewith.

With the axes of the shaft 114 and the bushing 110 arranged eccentric and with the socket 105 carried by the member 106 which includes the right angular disposed end parts 107 and 108 thereon that have sliding bearing in the grooves 113 and 109 of said shaft and bushing respectively, it is apparent that as said shaft is rotated, the member 106 rotates therewith and at the same time receives a movement transversely of the said axes. This produces what may be termed a "wabbling" action of the butt end of the partly finished spoke so that the portion adjacent thereto is formed to an elliptical cross section when presented to the cutter head. This "wabbling" movement of the socket 105 is best shown in Figs. 4–4ᴬ and 5–5ᴬ, parts being omitted from Figs. 4ᴬ and 5ᴬ for the sake of clearness.

I stated that the shaft 114 received its motion from the pinion 116 but inasmuch as it is necessary to position the socket member 105 in a predetermined position at the time it is to receive the butt portion of the spoke, means are provided whereby the rotation of the shaft 114 will be stopped while the pinion 116 continues to rotate. To this end, the pinion 116 is not directly connected to the shaft 114 but in turn is operatively connected by being positioned between friction discs 118 and 119. A clutch member 120 is keyed on a stud portion 121 projecting from the outer end of the shaft 114 and carries a friction disc 119 which is pressed toward pinion 116 as by means of the arched spring 122. The tension of the spring 122 may be adjusted by means of the threaded end portion 123 and nut 124. Thus under normal conditions the friction pressure is such as to cause the pinion 116 to rotate or cause rotation of the shaft 114. When, however, rotation of the shaft 114 is positively prevented the friction is overcome and while the pinion 116 continues to rotate, the shaft 114 remains at rest. The mechanism for restraining the rotation of shafts 114 is probably best shown in Figs. 6 and 11. It will be observed that on each shaft 114 there is keyed a cam-like member 125 which is provided with two abutment faces 126. Mounted upon the member 90 as by means of a stud shaft 127 is a dog 128 which normally tends to rotate in the direction of the arrow see Fig. 11. This tendency of rotation, however, is limited by an encompassing stationary band 129. At the proper point however, the band 129 is cut away as indicated at 130 thus permitting the torsion spring 131 to swing the dog so that its end portion 132 comes in contact with the abutment portions 126 of the member 125. Obviously since the member 125 is keyed to the shaft 114 rotation of the shaft is positively prevented. The dog remains in restraining position for a period sufficient to permit the convenient insertion of the butt end of the spoke into the socket 105 after which it is withdrawn by contact of curved portion 133 thereof with a roller 134 after which it rides upon the inner face of the member 129 for the remainder of the revolution.

Thus the wooden piece is gripped, swung in a generally circular path and given the various other motions heretofore described. The cutters for removing the material from the body portion of the spoke in this instance are mounted upon a drum 135. As here shown there are six sets of cutters equally spaced around the circumference of the drum all of which are alike in construction, so that a description of one only will be given. It will be observed that the cutters as here shown comprise a central cutter 136 and two side cutters 137 and 138. The cutter 136 extends diagonally of the face of the drum in one direction whereas the cutters 137 and 138 extend diagonally of the drum in an opposite direction. The outer portions of the different cutters are curved and are spaced at different distances from the piece so that the desired amount of stock will be removed as the cutters rotate past the pieces that are held, revolved, swung, and moved in and out by the mechanism heretofore described. It should be understood that a plurality of wooden pieces are being simultaneously acted upon by the body forming or shaping knives. As here shown the work of removing the material from the body portion is all accomplished during substantially 90 degrees of movement of the holders i. e. between the point where the spoke member 3ᴰ is gripped to the point along the vertical central plane of the machine. It should be observed that the knives rotate within the path of movement of the wooden pieces and that the arc or path of movement of the cutters is of smaller radius than the arc or path of movement of the wooden pieces. Also that the paths of movement are eccentric one to the other so that they gradually approach each other being closest adjacent the point where the last of the material is removed from the wooden piece. Therefore, the spokes gradually approach the knives that are rotating at high speed, and both moving along curved lines that approach each other, a beautiful cutting or skiving action results so that the spoke produced has a remarkably smooth surface, so much so that it is delivered in a condition much smoother than articles produced by any machine heretofore devised. Furthermore, the smooth character of the surface of the spoke is such as to obviate entirely the hitherto necessary operations of smoothing the spoke after it has been formed as by sanding or the like. Furthermore, this gradual approaching action of the wooden pieces and cutting knives imposes a minimum of abrasive interaction between the wood and the cutters and results in greatly increasing the effective cutting life of the knives.

After the body portion of the spoke has been shaped, it moves away from the cutter and when the holders reach the position where the rollers 102 meet the curved portion 100 of cam 99 the holding tip 98 is retracted, thus permitting the ejecting mechanism mounted within the chuck 105 to function. This ejecting mechanism, as here shown, is a spring 139 which tends to press outwardly a pin 140 so that the instant the tip 98 is retracted the spring 139 ejects the spoke. Inasmuch as the spoke may be too tightly wedged in place at times to permit the spring pressed pin to eject it, I provide a member 141 in the path of the advancing spoke which will positively cause its removal by preventing further rotation of the spoke with the holder 105.

To vary the eccentricity of the bushing 110 relative to the shaft 114 so that the to and fro movement of the socket 105 may be made greater the holder 111ª in which the bushing 110 is journalled (see Figs. 6 and 7) may be moved radially inward after the holding screw 112 is loosened, slots 142 and openings 143 in said holder permitting this radial movement. After the holder has been adjusted the bolt or set screw 112 is of course tightened. Obviously all of the holders will be adjusted so that they are positioned to move in the same circumferential path.

For causing high speed rotation of the drum 135 on which the cutters are mounted the drum is mounted upon a shaft 144 to the outer end of which is affixed a drive pulley 145.

Means are provided for adjusting the cutters to and from the path of movement of the wooden pieces i. e. for moving the drum 135 as a whole. To provide such an adjustment, one end of the shaft 144 is journalled in a bearing bushing 144ª fixed within an eccentric shaft-like portion 146 which, in turn, is mounted in a sleeve or bearing 147 that is carried by the frame of the machine. Fixed to the outer end of the eccentric sleeve member 146 will be found a crank portion 148 whereby the eccentric sleeve 146 may be rocked. By rocking the eccentric sleeve in one direction the drum 135 can be moved upwardly and by swinging it in the opposite direction the drum can be moved downwardly. The crank portion 148 is provided with an elongated slot 149 in which a cap screw 150 is accommodated. By means of the cap screw the parts can be held in any desired placed position. It should be observed that means are provided at each end of the shaft for giving it the same movement so that its true horizontal axis of rotation may be maintained. Hence similar parts at each end have been given similar reference characters. It should also be understood that the elements 86 and 90 are mounted for rotation respectively upon the eccentric sleeves or bearings 147 and 151 that are secured to opposite parts of the frame of the machine. In order to hold the members 86 and 90 so that they will rotate in their set position I have provided holding means in the nature of semi-circular clamp members 152 and 153 which are adapted to be clamped on the sleeve 147 as by means of the bolts or machine screws 154. The clamp members 152 and 153 are formed to embrace an annular portion 155 of the hub 156 of member 86. Therefore by loosening the screws 154 the clamp may be moved longitudinally and thereby pull the member 86 therewith. In this manner the distance between the opposite piece holding members may be adjusted to take pieces of different lengths.

*Driving gearing.*

This is probably best shown in Figs. 1 and 31. Shaft 158 is the main drive shaft and thereon are mounted the loose and drive pulleys 159 and 160. The shaft 158 carries a pinion 161 which meshes respectively with a pinion 162 and a large gear 163 that is mounted upon shaft 12. Shaft 12 is the one that carries the crank mechanism for actuating the intermittent feed mechanism. Gear 162 meshes with the large gear 164 that is mounted for rotation with shaft 61, which shaft 61 is operatively connected, as before described, to actuate or move the tenon cutters and butt facing cutters to and from the ends of the piece. On shaft 61 there is mounted a pinion 165 which meshes with a large gear 166 that is mounted upon the stud shaft 167. Stud shaft 167 also carries a pinion 168 that meshes with a gear 169 that is mounted upon the transverse shaft 89. The transverse shaft 89 also carries a number of gears most of which have already been described and which are probably best shown in Fig. 3. The gears, not described, however, is a gear 170 that is fixed with respect to the hub of gear 117 and which meshes with a gear 171 that is mounted on shaft 89. From the foregoing it should be apparent that the various parts of the machine that need to move in timed relation are so driven.

I have described the machine as being utilized for the production of vehicle wheel spokes of the finished form shown in Fig. 28 which is irregular in shape, oval in cross section part way of its length and substantially circular in cross section immediately adjacent its tenoned end. The machine can, however, be readily adjusted for the production of other shapes. For example, if a piece is to be formed which is of oval cross section throughout, means similar to the movable holder 105 could be provided to grip both ends of the piece. If a piece is desired which is of circular cross section throughout but tapering i. e. of different cross sectional diameters, the centers of the holder 105 and shaft 114 are brought into line by adjusting the parts best shown in Figs. 6 and 7 in which event the piece will revolve truly without eccentric motion and hence the shape cut will depend upon the shape of the cutting knives, which of course may be made in an infinite number of shapes.

My machine can also be readily adapted to